Aug. 10, 1971 — P. X. HOYNAK — 3,598,609
SOFT DRINK CONCENTRATE
Filed Jan. 22, 1968
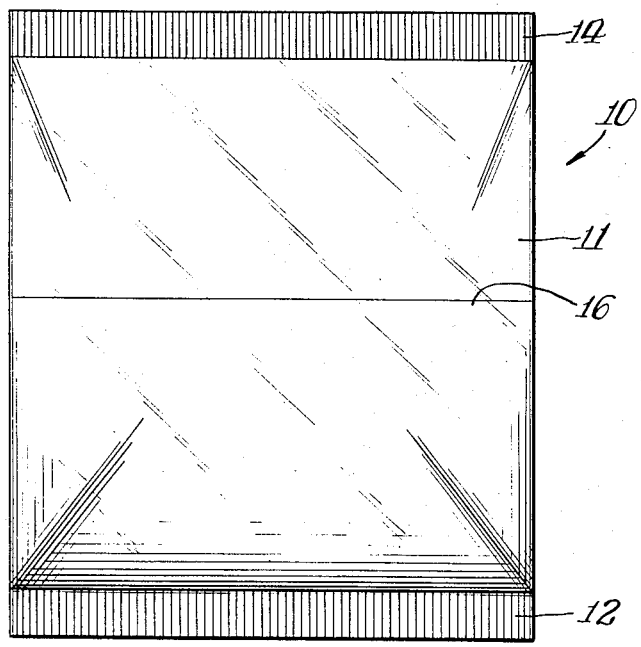
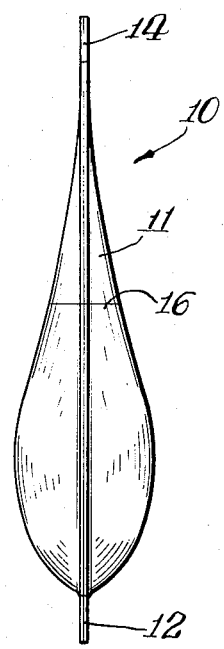
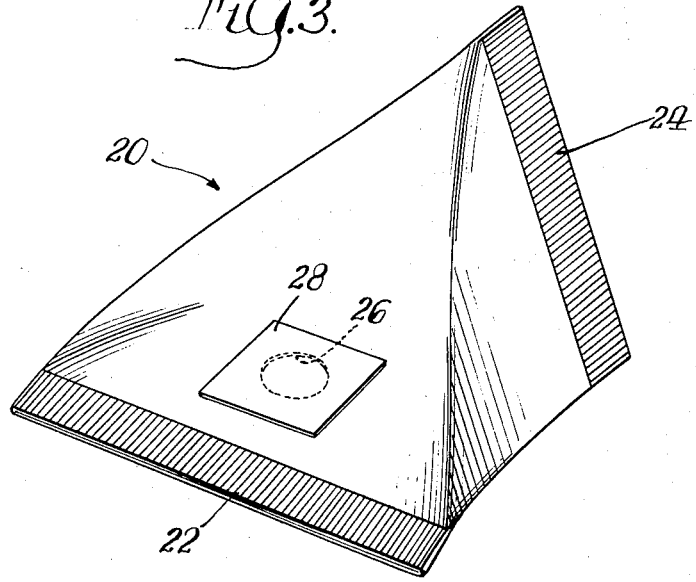
Inventor:-
Peter X. Hoynak,
By James L. Bailey Atty.

United States Patent Office 3,598,609
Patented Aug. 10, 1971

3,598,609
SOFT DRINK CONCENTRATE
Peter X. Hoynak, Fort Lee, N.J., assignor to
CPC International Inc.
Filed Jan. 22, 1968, Ser. No. 699,468
Int. Cl. A23l 1/00; C13k 1/06
U.S. Cl. 99—78                                   7 Claims

ABSTRACT OF THE DISCLOSURE

An acidic liquid concentrate containing a flavoring agent and as a sweetening agent, 30 to 70% by weight sucrose dissolved in a 25 DE starch hydrolysate syrup. The syrup contains 70 to 30% by weight dextrose. A unit portion of the liquid concentrate is packaged within a plastic pouch or tetrahedronal container.

---

There is a continual need in a consumer market place for a convenient package which contains one or a few servings of foodstuff, particularly where the package is of the disposable type, and the foodstuff may be utilized as such or by merely dissolving in water. For example, there is a long sought-after need for some type of a package containing a soft drink which can be made up by the consumer into one or a few individual servings with a minimum of time and effort.

It therefore becomes an object of the invention to provide a soft drink package which may be utilized to provide an individual serving of a soft drink.

A specific object of the invention is to provide a soft drink concentrate package which includes a disposable container and a liquid soft drink concentrate disposed in the container which may be conveniently utilized to from one or a few soft drinks upon proper formulation with appropriate amounts of water.

A still further object of the invention is to provide soft drink concentrates useful in such above described packages.

A specific object of the invention is to provide a soft drink concentrate which includes as a sweetener component at least sucrose and dextrose and a wide variety of flavoring agents.

Other objects will appear hereinafter.

In its broadest definition the package comprises a container for a unit portion of a liquid soft drink concentrate. The container should be capable of being easily opened to dispense the concentrate. In a greatly preferred embodiment the package contains a quantity of concentrate in an amount sufficient to supply one or more individual servings of a soft drink when stirred with the appropriate quantity of water.

In one preferred embodiment of the invention the package comprises a disposable container for the soft drink concentrate, and the concentrate is in a unit consumption amount such as in an amount sufficient to supply one individual serving of a soft drink upon mixing with an appropriate amount of water. The concentrate itself should be readily soluble in water, and in general contains at least one sweetening agent, and a flavoring agent. Other additives as needed to make a suitable concentrate formulation may also be contained therein.

In the drawing:
FIG. 1 is a plan view of a fruitade concentrate pouch containing an individual portion of the fruitade concentrate in accordance with one preferred embodiment of the invention;
FIG. 2 is a side view thereof, and
FIG. 3 is a perspective view of a concentrate package made up in accordance with another preferred embodiment of the invention, and in which the container is a disposable, tetrahedronal, plastic-coated paper container.

Referring now in detail to the drawing by numerals of reference, the numeral 10 in FIG. 1 denotes generally a beverage concentrate package in the form of a pouch 11 that is prepared in accordance with one embodiment of the invention. This pouch 11 is simply constructed. It is formed from a tubular sleeve of a flexible film of a clear, transparent, synthetic plastic material, heat-sealed at each of its ends to form closure seams 12 and 14 respectively. These seams are knurled in a conventional manner, for easy opening. The film may be made of any suitable-moistureproof, plastic material that is inert to liquid beverage concentrates. A film thickness of 3–4 mils is generally satisfactory.

A unit portion of liquid beverage concentrate 16 is disposed within the plastic pouch 11. Preferably the size of this portion is just sufficent for one individual serving upon simple stirring with the appropriate amount of water. However, it may be large enough, if desired, for admixture by simple stirring with one quart of water, or any other desired unit, for easy beverage preparation from the concentrate. To use the concentrate, one of the end seams is torn, and the concentrate is poured out. The manner in which the beverage concentrate 16 is formulated will be described presently.

In FIG. 3, the container for the concentrate is a disposable tetrahedronal package 20, formed of plastic coated paper or the like. It has closure seams 22 and 24 at its ends, and is formed with a discharge vent 26. This vent 26 is sealed with an easily detachable cover strip 28. To use this package, the strip 28 is removed and the contents are poured into a beverage receptacle.

The package preferably should be disposable and lightweight, such as the pouch that is shown in FIGS. 1 and 2 and that is formed from a tubular web of plastic film that is water-proof and that is substantially inert to the soft drink concentrate. Thus, the pouch may be formed from a wide variety of materials such as flexible plastics, cellophane, a suitably plasticized rubber-hydrochloride film, cellulosic film, vinyl film, films of polyethylene, etc.

In addition to the two types of containers shown in the drawings, a large number of other disposable, lightweight containers can be used. By way of further example, a pouch may be formed of waterproofed cellophane, with an opening at the top through which the concentrate is loaded. The back panel of the pouch may be formed with an upwardly projecting lip that can be folded over, along with a portion of the front panel, to effect closing.

The liquid, soft drink concentrate itself should be composed of both a sweetening agent and a flavoring agent, with or without other adjuvants.

As the sweetening agent, sugars such as mono- and disaccharides, including sucrose, invert sugar, glucose, mannose, maltose, galactose, lactose, fructose, sorbose, etc., and mixtures of these and like materials, may be employed. Edible polyhydric alcohols and the edible derivatives of mono- and disaccharides and polyhydrate alcohols may also be present. Likewise, the concentrate may contain glycerol propylene glycol, mannitol, sorbitol, and the like.

Synthetic sweeteners may also be utilized alone or in combination with the above sweetening agents. Thus cyclamate salts such as sodium or calcium cyclamate or saccharin may be employed.

Starch conversion products, such as starch hydrolysate syrups, are preferably used as the sweetening agent or as a major component thereof. These materials, usually having a DE (dextrose equivalent) in excess of 25, are obtained by treating starchy materials such as corn starch with acids, enzymes, or otherwise by using a combination of these conversion-effecting materials, whereby the starch is hydrolyzed to the degree sought.

A preferred soft drink concentrate is a liquid corn syrup that contains the flavoring agent. This concentrate preferably has a second sweetening agent comprising sucrose dissolved in the corn syrup, with or without added water. Particularly it has been found that an excellent sweetener combination comprises 30–70% by weight of sucrose and 30–70% by weight of dextrose based on total sweetener weight. More preferably the sweetener component comprises 40–60% by weight of sucrose and 40–60% by weight of dextrose, with typical sweetener components comprising 50% by weight of sucrose and 50% by weight of dextrose, or 60% by weight of sucrose and 40% by weight of dextrose. All percentages by weight are dry basis, unless otherwise expressed.

The use of a liquid concentrate results in complete miscibility upon simple mixing, when the concentrate is added to water or to a carbonated water.

Typically, the concentrate is a liquid that contains from about 40% to about 60% by weight of solids. The flavoring may be present in minute amounts of say 0.001%–0.1% by weight, based on total solids weight, or in larger amounts, if desired.

While corn syrup is a preferred form of starch hydrolysate for use in the sweetener, the starch that is hydrolyzed to obtain the desired starch conversion or starch hydrolysate material may be derived from any vegetable source, such as, for example, corn, wheat, potato, tapioca, rice, sago and grain sorghum. Waxy starches may also be used. Modified and unmodified starch may also be hydrolyzed to produce a desired sugar-based ingredient, as long as the modified starch when utilized does not adversely affect the edibility of the final starch hydrolysate product.

Both fresh fruit flavor and artificial fruit flavoring agents may be used in conjunction with the sweetening agent to produce the basic soft drink concentrate. For example, a variety of fresh flavors may be used in the production of a flavoring agent. Thus a number of fleshy type fruits which contain substantial flavor bodies may be utilized in the production of fruit flavors and essences. They may be illustrated by raspberry, cherry, blackberry, grape, strawberry, peach, banana, pineapple, apple, pear and the like. Artificial flavoring agents simulating the fresh fruit flavors listed above and others may also be utilized in the practice of the invention without departing from the scope thereof.

Other materials in addition to the sweetening and flavoring agents may also be present in the soft drink concentrates. For example, any of the edible vegetable gums, such as gum tragacanth, guar, arabic, and that derived from the locust bean, as well as related material such as carboxymethyl cellulose and the carrageen gums, may be used.

Still further components that may be present include chelating agents such as ethylenediaminetetraacetic acid (EDTA) or the edible sodium calcium salts of this acid, for the purpose of sequestering metal ions which otherwise might catalyze oxidative deteriorative changes leading to off-flavors. Still further additives include sorbic acid and its edible salts (calcium, potassium and sodium), lecithin or hydroxy lecithin, citric acid, fumaric acid, vitamins, minerals, dyes, colorants, etc.

In a particularly preferred embodiment the liquid soft drink concentrate also contains citric acid to impart a tart flavor thereto. Usually the liquid concentrate, when dissolved in water, has a pH in the range from about 2 to about 4 when an acid, such as citric acid, is utilized as a flavorant.

SOFT DRINK CONCENTRATE PACKAGES

A number of soft drink beverage concentrates were prepared and placed in easily openable light-weight pouches of the disposable type shown in FIGS. 1 and 2.

Each pouch was formed from a tubular sleeve of waterproof, substantially inert, transparent, plastic films. Each pouch was filled with a unit consumption amount of concentrate, sufficient to provide a single portion of a soft drink, such as a fruitade, after simple mixing with an appropriate amount of water. In each instance, one ounce of the concentrate was added to five ounces of water, to yield a six ounce portion of beverage suitable for immediate consumption.

Several fruit flavored, syrup-base concentrates were prepared as follows.

TABLE I

| Flavor | Finished beverage brix, degree | Pounds of sweetener per gallon of syrup [1] |
|---|---|---|
| Cola | 11.0 | 5.5730 |
| Cream | 12.1 | 6.3820 |
| Ginger Ale | 9.0 | 4.8280 |
| Lemon | 10.1 | 5.3280 |
| Raspberry | 12.0 | 6.2330 |
| Root beer | 11.0 | 5.5730 |

[1] 60% sucrose-40% dextrose by weight based on total sweetener weight.

Other liquid concentrates have been made for the preparation of other of the popular citrus, fruitade beverages. These included limeade, orangeade, grapefruitade, and mixed citrust concentrates. Usually these are prepared by adding synthetic flavors and citric acid to sweetener bases prepared by blending sucrose and corn syrup. However, in the case of the stronger natural flavors, such as, for example, lemon and lime, natural juices may be employed in place of, or in combination with, artificial flavors. A selection of materials that provides about one fluid ounce of concentrate per individual serving is preferred.

Portions of lemonade concentrate in tetrahedronal packages, such as shown in FIG. 3, are convenient to use and very popular.

Ordinarily the packages need no refrigeration or preservative, but mold inhibitors, chelating agents, and the like, may be included in the liquid concentrates if desired, in legally permissible amounts.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. An acidic liquid concentrate having from about 40% to about 60% by weight solids content, dry basis, consisting essentially of:
    (a) a flavoring agent;
    (b) a sweetening agent syrup comprising from about 30% to about 70%, by weight sucrose, dry basis, dissolved in a starch hydrolysate syrup having a DE in excess of about 25, wherein said hydrolysate syrup contains from about 70% to about 30% by weight, dextrose, dry basis, and wherein said concentrate is completely and readily miscible and soluble in water or carbonated water upon simple mixing in the absence of any added alkaline material.

2. An acidic liquid soft drink concentrate for preparing an individual serving therefrom consisting essentially of:
    (a) a flavoring agent present in an amount of from about 0.001% to about 0.1% by weight, based on total solids weight,
    (b) a sweetening agent syrup comprising from about 40% to about 60% by weight, sucrose, dry basis, dissolved in corn syrup as the starch hydrolysate syrup having a DE in excess of about 25, wherein said corn syrup contains from about 60% to about 40% by weight, dextrose, dry basis, and wherein said concentrate is completely, readily miscible and soluble in water or carbonated water in the absence of any added alkaline material, and (c) an aqueous vehicle.

3. The acidic concentrate of claim 2 wherein the flavoring agent is natural fruit flavoring.

4. The acidic concentrate of claim 2 wherein the flavoring agent is artificial flavoring.

5. The acidic concentrate of claim 2 and including an acidic flavoring agent, wherein said acidic liquid concentrate when dissolved in water has a pH in the range of from about 2 to about 4.

6. The acidic concentrate of claim 5 wherein said acidic flavoring agent is citric acid.

7. The acidic concentrate of claim 2 wherein said sweetening agent syrup contains about 60% by weight sucrose, dry basis, dissolved in corn syrup having a DE in excess of about 25, wherein said corn syrup contains about 40% by weight dextrose, dry basis.

References Cited
UNITED STATES PATENTS

| | | | |
|---|---|---|---|
| 2,151,499 | 3/1939 | Buchanan | 99—142 |
| 2,992,118 | 7/1961 | Daline | 99—171 |
| 3,100,909 | 8/1963 | Schapiro | 99—78 |
| 3,183,099 | 5/1965 | Schultz et al. | 99—141X |
| 3,427,167 | 2/1968 | Michael et al. | 99—78X |

OTHER REFERENCES

Tetra Pak Series T, 6–1965, pp. 7 and 35.

JOSEPH SCOVRONEK, Primary Examiner

S. B. DAVIS, Assistant Examiner

U.S. Cl. X.R.

99—141R, 142, 171B; 127—29